May 30, 1961  L. EICKHOFF  2,986,023
CLUTCH ADJUSTMENT MEANS
Filed Oct. 22, 1959
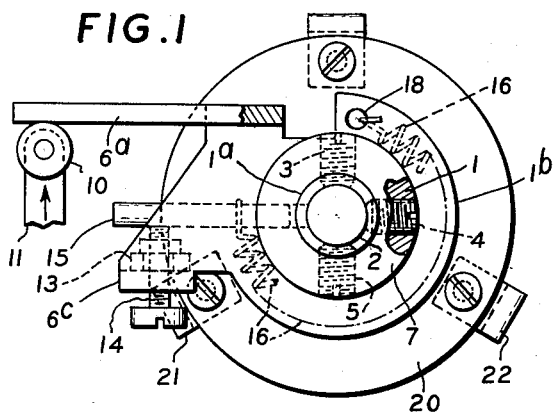
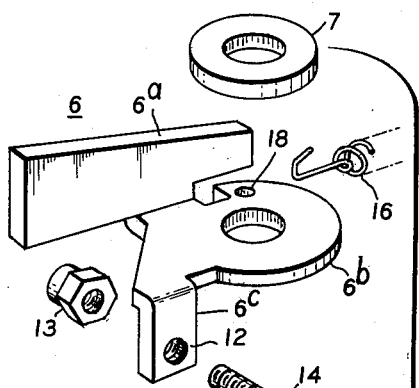
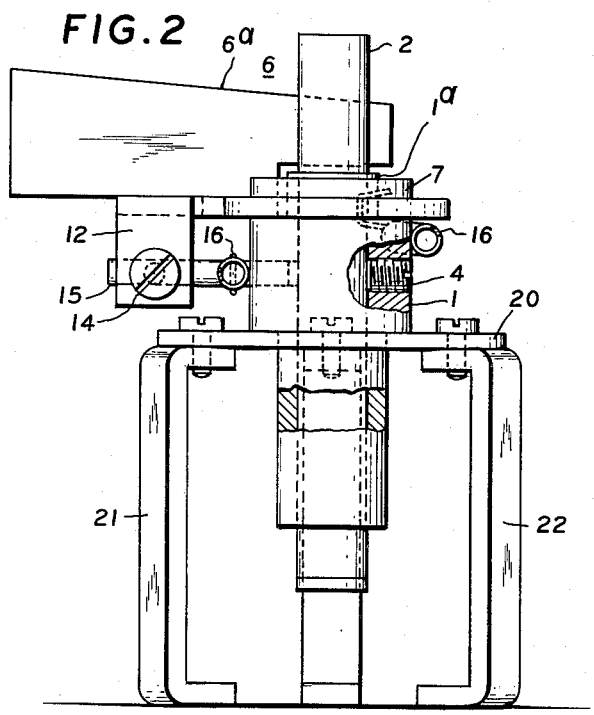
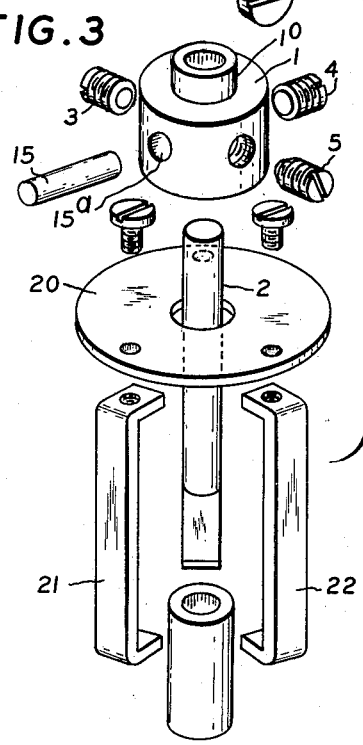
INVENTOR
LOUIS EICKHOFF
BY Samuel Stoll
ATTORNEY United States Patent Office 2,986,023
Patented May 30, 1961

2,986,023

CLUTCH ADJUSTMENT MEANS

Louis Eickhoff, Patchogue, N.Y., assignor to Robco Corporation, Patchogue, N.Y., a corporation of New York Filed Oct. 22, 1959, Ser. No. 847,976

4 Claims. (Cl. 64—24)

This invention relates to clutch adjustment means and more particularly to means for making very fine angular adjustments in a shaft coupling device or the like.

The present invention provides a clutch or coupling for a shaft drive of the type adapted to accurately rotate the shaft through a predetermined angle generally but not necessarily smaller than 360 degrees; for instance, where it is desired to set a timing shaft at a predetermined angular position for accurately determining a timing interval.

It is not possible, by the conventional use of set screws, to make small angular adjustments of a shaft and shaft collar or hub relative to each other. For example, it is not possible to make fine adjustments of a shaft coupling (in the form of a collar or hub) relative to a shaft by the very same set screws which secure said coupling to said shaft once the adjustment is made. The set screws cut holes into the shaft and tend to re-seat themselves when moved but slightly out of registration with said holes. This prevents small adjustments of the order of a few degrees of rotation.

The present invention provides means for making small, accurate, angular adjustments in a shaft coupling, comprising a collar or hub which may be securely affixed to a shaft, a driven plate member rotatably mounted on said collar or hub, and adjustable drive means between said collar or hub and said plate, including a drive pin secured to said collar or hub and adjustable screw means supported by said driven plate member for engagement with said drive pin. A spring urges the driven plate member to rotate in such direction as to bring the adjustable screw means into engagement with the drive pin. The adjustable screw means may thereby be used against the drive pin to control or modify the angular relationship between said driven plate member and said collar or hub. Since the collar or hub is securely attached to a shaft, this would constitute means for adjusting the relative angular positions of said driven plate member and said shaft.

In one application of the present invention it is used to turn a timer shaft a predetermined number of degrees in response to the linear motion of a coin pusher plate in a coin operated washing machine. In this application it was found that as certain parts became worn, for instance, the timer contacts, it was periodically necessary to make small angular adjustments in order to accurately control the desired timing cycle. Heretofore, these adjustments were made by manually moving a hub or collar on the shaft and securing them to each other with set screws. However, for small adjustments this system was not practical as the screws tended to dig holes into the shaft and to reseat themselves unless the adjustment was sufficiently large to completely avoid the previously formed set screw holes in the shaft.

Accordingly, a principal object of the invention is to provide new and improved means for making small accurate adjustments in a shaft drive of the type wherein it is desired to rotate the shaft accurately a greater or lesser angular distance than 360 degrees.

Another object of the invention is to provide new and improved shaft coupling means.

Another object of the invention is to provide new and improved clutch means for a shaft drive.

Another object of the invention is to provide new and improved adjustable clutch means for a shaft drive.

Another object of the invention is to provide new and improved yieldable shaft coupling means.

Another object of the invention is to provide new and improved adjustable clutch means for a shaft drive comprising a hub permanently affixed to a shaft, a driven plate member rotatably mounted on the hub, a spring connecting said hub and said plate for rotation, and adjustable drive or stop means for accurately setting the angular relation of said plate and said hub.

These and other objects of the invention will be apparent from the following specification and drawings, of which:

Figure 1 is a plan view of the embodiment of the invention.

Figure 2 is an elevation view of the emobdiment of Figure 1, and

Figure 3 is an exploded view of the embodiment of Figure 1.

Referring now to the details of the drawing, it will be noted that the adjustable clutch herein claimed is provided with a hub 1 which is mounted on a vertical timer shaft 2 and held in place thereon by means of set screws 3, 4 and 5. Although only a single set screw would suffice for this purpose, as a practical matter three are more satisfactory because at least one of them would be readily accessible irrespective of the angular position of the hub. Clutch plate means 6 is rotatably mounted on a reduced extension 1a of hub 1 and it is held thereon by means of a washer 7 which may be secured to the hub extension by any conventional means, for example, peening over the end of said hub extension.

Clutch plate member 6 comprises a flag-like clutch plate 6a which is normally mounted in a vertical plane, a horizontal portion 6b having a shaftway formed centrally thereon to receive the hub extension, and a downwardly projecting lug 6c extending from said horizontal portion 6b. Clutch plate 6a and lug 6c extend in vertical planes when hub 1 is mounted in conventional manner on timer shaft 2, the timer shaft being supported in a conventional mounting plate 20 on mounting brackets 21 and 22.

A hole 12 is formed in lug 6c and a locknut 13 is secured to said lug in alignment with said hole. An adjustment screw 14 projects through hole 12 and is accommodated by locknut 13. A radial hole 15a is formed in hub 1 and a pin 15 is secured at one end in said hole. The pin projects radially from the hub in a common horizontal plane with adjustment screw 14 and it will be observed that said adjustment screw is adapted to conduct said pin in the manner shown in Fig. 1. A coil spring 16 is connected at one end to said pin 15 and it extends around hub 1, as shown in Fig. 1, the opposite end of said spring being hooked into a mounting hole 18 in the horizontal portion 6b of the clutch plate means 6. The action of the spring is to urge the hub and clutch plate means in opposing angular directions to hold pin 15 and screw 14 in contact with each other.

It will now be seen that the relative angular position of the hub and timer shaft on the one hand and the clutch plate means on the other hand may be varied by adjusting screw 14 relative to nut 13. When the screw is turned in clockwise direction as viewed in Fig. 2, it will move axially in the direction of pin 15 and cause said pin, together with the hub and the timer shaft, to move in clockwise direction as viewed in Fig. 1. When the adjusting screw is turned in counter-clockwise direction as viewed in Fig. 2, its axial movement will be away from pin 15, and it will enable said pin, said hub and the timer shaft to move in counter-clockwise direction, as viewed in Fig. 1, in response to the action of spring 16 thereon.

The subject clutch may be used to drive a timer to the proper increment of start when the timer is used to control a clothes washing or drying machine or any other machine having a timing mechanism. The operation of the mechanism is effected by utilizing any conventional coin receiving device which has a blade 11 and a roller 10 mounted at the end of said blade, or equivalent clutch-actuating means. When blade 11 is moved in the direction of the arrow in Fig. 1, roller 10 engages clutch plate 6a and causes the entire clutch means to rotate in clockwise direction to the extent imposed by the forward movement of said blade 11. Clockwise movement of said clutch plate means causes a corresponding clockwise movement of the timer shaft driven by screw 14, pin 15 and hub 1. Blade 11 may now be retracted by conventional means and the timer shaft will be driven in counter-clockwise direction, as viewed in Fig. 1, by a conventional timer motor. Conventional stop means are provided for stopping such counter-clockwise movement at a predetermined time or at a predetermined angular position of the timer shaft.

Repeated operations of the timer device often cause the timer contacts to wear and this, in turn, results in what is known in the industry as a "non-start" on the subject washing or drying machine. This would require a re-setting of the clutch and normally would be done by loosening the set screws 3, 4 and 5 and angularly moving the hub relative to the timing shaft to the extent deemed necessary to correct the timing cycle. When such angular movement is relatively small, as has above been indicated, the set screws 10 re-set themselves in their original positions on the timer shaft, and the fine adjustment is thereby nullified. In the present device such adjustment is effected by turning the adjustment screw 14 in the proper direction, the hub remaining fixed to the timer shaft as before. A very fine adjustment, fully controlled, may thereby be effected to correct the timing cycle.

It will now be understood that the clutch may be mounted in various positions on washing or drying machines, depending upon their make and design. As shown in Fig. 1, the clutch plate 6a would be pushed by blade 11 in order to start the timing cycle. If the clutch were positioned in such manner that the clutch plate 6a were disposed in a diametrically opposite position, a pulling action upon it would be required in order to start the timing cycle. In both cases the movement of the clutch and timer shaft would be in clockwise direction, as viewed in Fig. 1, in order to start the cycle.

The foregoing is illustrative of a clutch means for a drive shaft as applied to one type of machine, to wit, a clothes washing or drying machine. It will be understood that the same mechanism may be applied to other machines as well and that modifications and variations may be incorporated into said clutch means within the broad spirit of the invention and the scope of the claims.

For example, what has above been described is an adjustable shaft coupling in which either the clutch member or the shaft may be the driving or driven member. The clutch member may drive the shaft or be driven by the shaft through the adjustable screw means. Actually, in a washing or drying machine installation, the clutch member initially drives the timer shaft and then the timer shaft takes over and drives the clutch member. It should also be understood that the precise hub and clutch construction shown in the drawing is not critical and variations may be incorporated in them. For example, while the use of the hub is preferred in a conventional washing or drying machine installation, it will be apparent that the hub is not itself a critical component and may be dispensed with. In such case, the clutch member would be rotatably mounted on the shaft and the stop pin 15 would be secured directly to the shaft. The hub is used mainly because a timer shaft is relatively small in diameter and it is found more convenient to provide the entire clutch assembly in the form shown in the drawing, namely, including a hub.

I claim:

1. An adjustable clutch for a shaft drive, comprising a hub adapted to be affixed to a shaft, a clutch plate rotatably mounted on said hub, said clutch plate having an extension piece which substantially parallels the axis of the hub, a spring connecting said hub and said clutch plate and urging them in opposite angular directions, and means to adjust the angular relationship between said clutch plate and said hub, comprising a pin connected to the hub and an adjustment screw in said extension member, one end of said screw bearing against said pin under the influence of said spring.

2. An adjustable shaft coupling, comprising a shaft member, a hub affixed to said shaft member, a clutch plate member rotatably mounted on said hub, said clutch plate member having an extension piece which substantially parallels the axis of the hub, a spring connecting said hub and said clutch plate member and urging them in opposite angular directions, and means to adjust the angular relationship between said clutch plate member and said hub, comprising a pin connected to the hub and an adjustment screw in said extension member, one end of said screw bearing against said pin under the influence of said spring, one of said shaft and clutch plate members being the driving element and the other of said members being the driven element, the driving action being effected through the instrumentality of said adjustment screw.

3. An adjustable shaft coupling in accordance with claim 2, wherein the clutch plate member is the driving member and the shaft member is the driven member.

4. An adjustable shaft coupling in accordance with claim 2, wherein the shaft member is the driving member and the clutch plate member is the driven member.

References Cited in the file of this patent

UNITED STATES PATENTS

| | | |
|---|---|---|
| 791,329 | Dodge | May 30, 1905 |
| 2,317,147 | Keen et al. | Apr. 20, 1943 |